United States Patent [19]

Macevicz et al.

[11] Patent Number: 4,609,463
[45] Date of Patent: Sep. 2, 1986

[54] WATER PURIFICATION DEVICE

[75] Inventors: Clement C. Macevicz, San Diego; Byron J. Mulherin, Jr., San Marcos, both of Calif.

[73] Assignee: Nimbus Water Systems, Inc., Escondido, Calif.

[21] Appl. No.: 676,983

[22] Filed: Nov. 30, 1984

[51] Int. Cl.⁴ .............................................. B01D 13/00
[52] U.S. Cl. .................. 210/238; 210/257.2; 210/321.5
[58] Field of Search ...................... 210/232, 238, 257.2, 210/260, 266, 282, 321.1, 449, 321.5

[56] References Cited

U.S. PATENT DOCUMENTS

| | | | |
|---|---|---|---|
| 3,367,504 | 12/1964 | Westmoreland | 210/321 |
| 3,397,790 | 8/1968 | Newby et al. | 210/321 |
| 3,680,706 | 8/1972 | Baer et al. | 210/238 |
| 3,746,174 | 7/1973 | Watanabe | 210/449 |
| 3,822,018 | 7/1974 | Krongos | 210/449 |
| 3,887,463 | 6/1975 | Bray | 210/110 |
| 4,218,317 | 8/1980 | Kirschmann | 210/117 |

FOREIGN PATENT DOCUMENTS 554198  6/1943  United Kingdom ................ 210/238

OTHER PUBLICATIONS

Kirschmann Reverse Osmosis Water Purifier Model RO-20 Owners Manual, 1978, Home Pure Water Corp.

*Primary Examiner*—Ivars Cintins
*Attorney, Agent, or Firm*—Fitch, Even, Tabin & Flannery

[57] ABSTRACT

A reverse osmosis water purification device for attachment to a kitchen faucet or the like employs a substantially leak-proof, two-piece pressure vessel containing a readily replaceable reverse osmosis module. In the preferred embodiment, a handle is provided on the module to facilitate removal thereof from the pressure vessel. Also in the preferred embodiment, carbon-felt disks are provided to provide filtering for water after the water has been purified by reverse osmosis membranes.

6 Claims, 6 Drawing Figures

U.S. Patent  Sep. 2, 1986  4,609,463
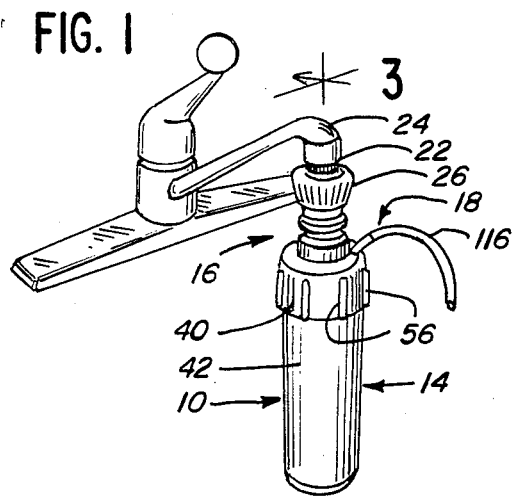
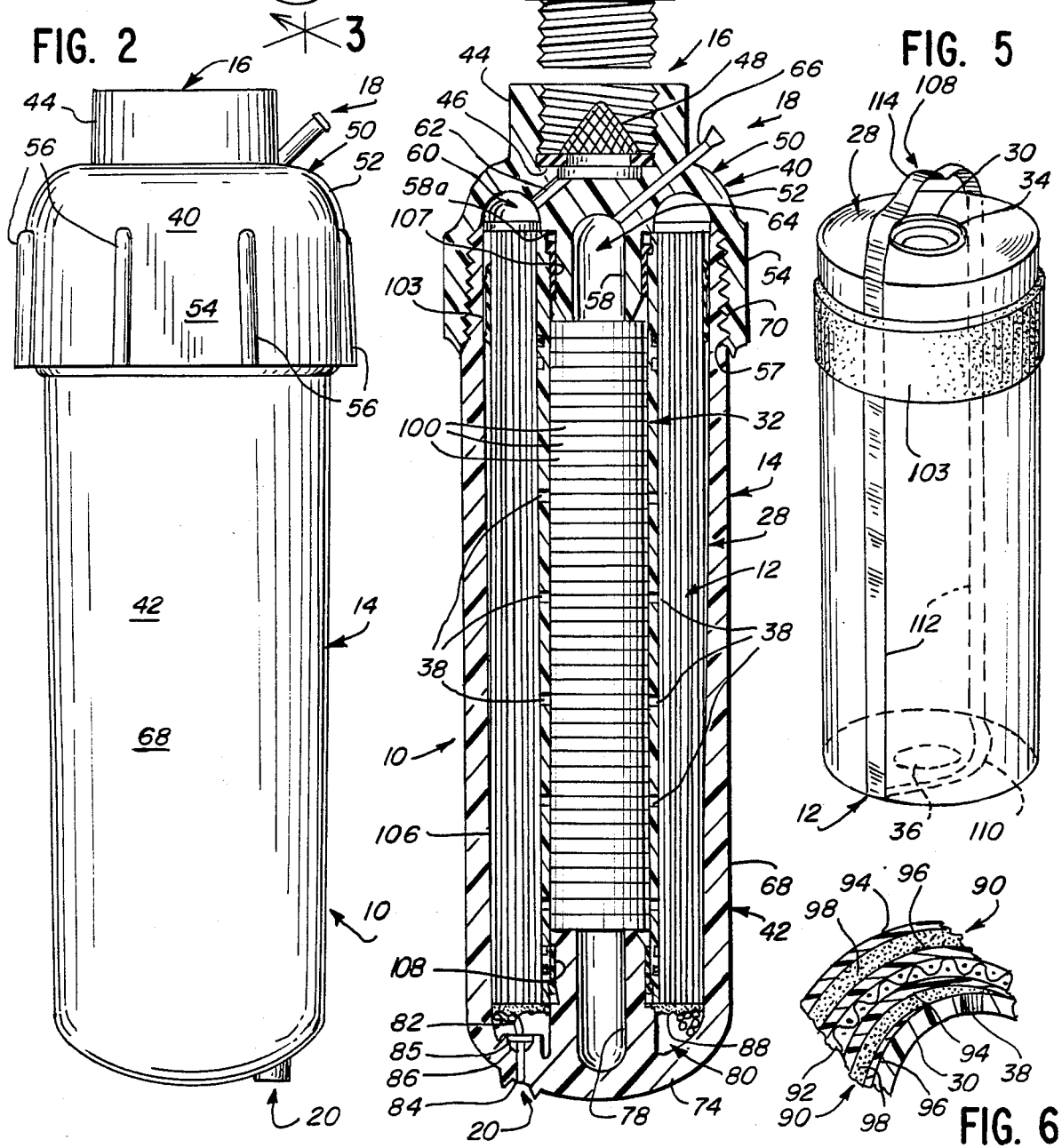

WATER PURIFICATION DEVICE

BACKGROUND OF THE INVENTION

The invention relates generally to water purification devices, and more particularly to a water purification device employing reverse osmosis.

Reverse osmosis is a well known process for removal of dissolved materials from water. See, for example, U.S. Pat. Nos. 3,367,504; 3,887,463; and 3,397,790. It has been proposed that reverse osmosis be used in devices for consumer use to purify tap water. For example, U.S. Pat. No. 4,218,317 describes a reverse osmosis water purifier for snap-on engagement to a faucet.

A reverse osmosis water purification device typically includes a housing containing a semipermeable membrane which permits water to pass through but is substantially impermeable to certain impurities. Reverse osmosis involves providing high pressure within the housing to force unpurified water through the membrane, while impurities are prevented from passing through.

It is desirable that the housing for such a device be capable of opening and reclosing to permit replacement of the reverse osmosis membrane, and that such replacement be relatively easily accomplished. It is also desirable that the housing be capable of containing high water pressure without leaking.

SUMMARY OF THE INVENTION

It is a general object of the invention to provide an improved water purification device for consumer use.

It is an additional object of the invention to provide a reverse osmosis water purification device which has a reclosable housing and which is substantially leakproof under normal operating conditions.

It is a further object of the invention to provide a water purification device which includes means to facilitate replacement of the reverse osmosis membrane.

Additional objects and features of the invention are set forth in the following description of the preferred embodiment of the invention.

BRIEF DESCRIPTION OF THE DRAWINGS

FIG. 1 is a perspective view of a device in accordance with the invention, shown in installed relation on a water faucet.

FIG. 2 is an elevational view of the pressure vessel of the device of FIG. 1, shown on an enlarged scale.

FIG. 3 is a sectional view taken substantially along line 3—3 in FIG. 1 and looking in the direction of the arrows, with the quick-disconnect coupling and adapter shown separately from the remainder of the device.

FIG. 4 is a perspective view of a felt disk used in the device of FIG. 1.

FIG. 5 is a perspective view of a reverse osmosis module used in the device of FIG. 1.

FIG. 6 is a fragmentary transverse sectional view illustrating a portion of the module of FIG. 5.

DETAILED DESCRIPTION OF THE PREFERRED EMBODIMENT

The invention is preferably embodied in a water purification device 10 which includes a generally cylindrical reverse osmosis module 12 disposed within a pressure vessel 14. The vessel 14 includes an inlet 16 for inflow of unpurified water, a first outlet 18 for outflow of purified water, and a second outlet or drain 20, for outflow of impurities carried by a portion of the unpurified water. The illustrated device includes an adapter 22 for installation on a conventional kitchen faucet 24 and a quick disconnect coupling 26 for cooperation with the adapter 22. The quick disconnect coupling 26 is of known design, and includes a vertically movable, upwardly biased annular actuator 26a which is pulled downwardly to enable disconnection of the coupling 26 from the adapter 22.

The module 12 includes a spirally wrapped membrane assembly 28 disposed upon a tubular core 30. The core 30 has a hollow interior partially filled by a filtering medium 32 and has open upper and lower ends 34 and 36 respectively. The module 12 is removable to permit replacement.

Briefly, during operation, unpurified water flows into the pressure vessel 14 through the inlet 16 downwardly into the module 12 where a portion of the water is purified. Purified water is carried in a spiral path to the core 30 of the module 12 and passes into the interior of the core 30 through a plurality of openings 38 therein. A portion of the unpurified water passes downwardly through the module 12 without being purified, carrying with it substantially all of the impurities which were present in the entering water, and exits through the drain 20.

During use, normal line pressure is maintained within the vessel 14. Relatively high pressure is necessary for proper functioning of the device. Leakage is undesirable, not only because it reduces pressure within the vessel, but also because it makes the unit less attractive to the consumer.

In accordance with the invention, the water purification device 10 is substantially leakproof and includes features to facilitate replacement of its reverse osmosis module 12. In addition, the device 10 is relatively economical to manufacture and assemble.

The pressure vessel 14 includes an upper member 40 and a lower member 42. The upper member 40 is preferably injection-molded, which enables precise formation thereof to provide acceptable tolerances for sealing purposes. The upper member 40 has an internally threaded, upwardly facing inlet fitting 44 thereon for engagement with the quick-disconnect coupling 26. The fitting 44 has an annular seal 46 at its bottom for sealing engagement with the bottom of the quick-disconnect coupling 26. A filter screen 48 is disposed radially inwardly of the seal 46. The upper member 40 further includes a skirt portion 50 which includes a portion 52 extending outwardly and downwardly from the fitting 44, and a generally tubular, generally vertical outer wall 54. Vertical ribs 56 are provided on the exterior of the outer wall 54 to facilitate gripping thereof and improve its rigidity. The upper member 40 is open at the bottom to receive the lower member 42, and has an internal thread 57 for connection thereto.

A generally tubular inner wall 58 extends downwardly beneath the fitting 44 within the outer wall 54. The wall 58 has a shoulder 58a thereon which engages the upper end of the core 30. An annular inlet plenum 60 is defined between the inner and outer walls 58 and 54 of the upper member 40. A bore 62 connects the interior of the fitting 44 to the inlet plenum 60 to direct flow of unpurified water into the inlet plenum 60.

The interior of the tubular wall 58 of the upper member 40 also defines an outlet plenum 64 for purified water. An outlet tube 66 extends from the outlet plenum 64 through the upper member 40 to enable purified water to flow from the outlet plenum 64 to an exterior destination.

The lower member 42, like the upper member 40, is preferably injection molded. The lower member 42 includes a generally tubular outer wall 68 which has an external thread 70 formed thereon near its upper end for engagement with the internal thread 57 of the upper member 40.

The lower member 42 further includes a bottom wall 74 having a convex exterior surface. An annular receptacle 80 centered about a wall 78 receives the water carrying the impurities.

A coiled capillary tube 82 is disposed in the receptacle 80 and extends through an opening 84 in the bottom wall 74 of the lower member 42. The water from the receptacle 80 flows through the capillary tube 82 to exit the pressure vessel 14. Due to its length and small diameter, the capillary tube 82 provides resistance to flow of water to maintain reasonably high pressure within the vessel.

It will be appreciated that the flow rate through the capillary tube 82 is related to the pressure in the vessel 14 in that increases in pressure within the vessel 14 increase the flow rate through the capillary tube 82. To control the flow rate, means are provided to restrict flow through the capillary tube 82 in response to increases in pressure within the vessel 14. To this end, an elastic ring 85 engages the exterior of the capillary tube 82 and is disposed in a seat 86 formed in the bottom wall 74. The seat 86 is generally frustoconical, and is centered about the opening 84. Increases in pressure within the receptacle 80 drive the ring 85 into the seat 86, thus constricting the capillary tube 82.

Due to the relatively small diameter of the capillary tube 82, it is susceptible to becoming obstructed by particulate matter. To prevent such obstruction, an annular filter 88 is disposed between the module 12 and the receptacle 80. The filter 88 has a relatively large surface area so that it is unlikely to become clogged during the life of the device 10.

The module 12 herein, as noted above, comprises a spirally wrapped membrane assembly 28 disposed upon a perforated tubular core 30 having a filtering medium 32 disposed therein. Referring to FIG. 6, the membrane assembly 28 comprises a spirally wrapped envelope 90 and a spirally wrapped separator grid 92 wound together on the core 30 so that adjacent windings of the envelope 90 are separated from one another by the separator grid 92.

The envelope 90 comprises first and second semipermeable membranes 94, 96 and a layer 98 of porous material disposed therebetween. The envelope 90 is open at its inner edge adjacent the core 30, but is sealed by joining of the upper, lower, and outer edges of the semipermeable membranes 94, 96 so that during operation, water passes through the semipermeable membranes 94, 96 into the porous material 98 and through the porous material 98 to the core 30. A similar arrangement is described in U.S. Pat. No. 3,367,504.

The filter medium 32 disposed within the core 30 preferably comprises a plurality of carbon-felt disks 100. Each disk 100 comprises a layer 102 of felt permeated with carbon and a layer 104 of backing material. The purified water is "polished" by the carbon as it passes therethrough to the outlet plenum 64.

It has been proposed that loose carbon or charcoal be used in the interior of the core 30 rather than the disks 100. While this also provides the desired filtering function, the loose material is somewhat messy and difficult to contain. The felt disks 100 are preferred as they facilitate assembly and eliminate the spillage of carbon particles associated with replacing or otherwise handling the module 12.

It has been found that, after the module 12 has been used for a period of several months, it may be desirable to replace it. However, manual removal of the module 12 from the lower member 42 can be difficult, as the module fits tightly within the lower member. To facilitate removal, a handle 108 is provided. The preferred handle 108 comprises a loop of flexible material having a bottom portion 110 which extends beneath the lower end of the module, side portions 112 extending up the sides of the module, and a top portion 114 extending above the module 12. The side and bottom portions 112 and 110 are relatively taut and may be held in place by tape (not shown). The top portion 114 is slack so that the module 12 may be easily removed simply by grasping the top portion 114 and pulling it upwardly while maintaining the lower member 42 of the pressure vessel 14 in a stationary position.

To summarize operation of the device 10, unpurified water flows from a faucet or the like through the quick-disconnect coupling 26, through the fitting 44 on the upper member 40, and through the bore 62 to the inlet plenum 60. The water in the plenum 60 is at relatively high pressure and flows downwardly into the module 12 between the windings of the envelope 90. Water is forced by the pressure through the semipermeable membranes 94, 96 into the porous material 98, while the semipermeable membranes prevent dissolved materials from passing therethrough. The purified water travels in a spiral path to the interior of the winding, exiting through the openings 38 in the core, whence it flows upward through the carbon-felt disks 100 to the outlet plenum 64, and ultimately through the outlet tube 66 to which may be connected an exterior tube 116. Simultaneously, a portion of the unpurified water flows downwardly to the bottom of the vessel 14 between the windings of the envelope 90 without being purified, carrying the impurities into the receptacle 80. Any large particles which might pass through the screen 48 or which might be formed over a period of usage by the reverse osmosis process are trapped by the filter 88 beneath the module 12. This water then flows through the capillary tube 82 and exits the vessel 14.

To prevent unpurified water from bypassing the module 12 and flowing downwardly between the module 12 and the outer wall 68 of the lower member 42, a sealing ring 103 is disposed on the exterior of the module 12, and the outer wall 68 tapers slightly inward as it proceeds downward so that it seals tightly against the lower end of the module 12 along a lower end portion 106 of its exterior surface. Thus, two separate seals are provided, at 103 and 106. During installation, the module 12 is inserted downwardly into the lower member 42 until contact is made between the bottom portion 106 of the module exterior and the interior of the outer wall 68 of the lower member 42, and between the sealing ring 103 and the interior of the wall 68. When the upper member 40 is tightened down, the module 12 is forced downwardly by the engagement between the shoulder 58a on the upper member 40 and the core 30. This causes the lower end of the module 12 to be slightly compressed, and the sealing ring 103 on the exterior of the module 12 is also compressed. This compression provides effective seals between the module exterior and the wall 68.

To prevent unpurified water from flowing directly into the interior of the core along the exterior of the inner wall 58 of the upper member 40, or along the exterior of the inner wall 78 of the lower member 42, suitable annular seals 107 and 108 are disposed between the interior of the core 30 and the respective walls.

From the foregoing, it will be appreciated that a novel and improved water purification device is provided. While a preferred embodiment of the invention has been described above, there is no intention to limit the invention to this or any particular embodiment.

What is claimed is:

1. A water purification device for separating water from dissolved impurities therein, comprising:
   a two-piece pressure vessel;
   a reverse-osmosis module disposed within said pressure vessel, said reverse-osmosis module comprising a spirally-wrapped membrane assembly disposed on a perforated tubular core;
   an inlet fitting on said pressure vessel for enabling flow of unpurified water into said pressure vessel;
   first outlet means on said pressure vessel for enabling flow of purified water from said pressure vessel; and
   second ontlet means on said pressure vessel for enabling restricted flow of unpurified water and impurities from said pressure vessel;
   said pressure vessel comprising an upper member and a lower member, said inlet fitting being disposed on said upper member and including quick-disconnect coupling means thereon to enable releasable connection of said device to a source of water;
   each of said upper and lower members having an outer wall;
   said upper and lower members having mutually cooperable threads formed on their outer walls to enable said members to be releasably attached to one another;
   an inlet plenum being defined above said module for receiving unpurified water from said inlet fitting and a receptacle being defined beneath said module for receiving unpurified water and impurities from said module;
   said lower member having a gradually tapered interior, said interior having a larger inner diameter adjacent its upper end than adjacent its lower end, said module being dimensioned so that a lower portion of said module is compressed by, and sealed against, said gradually tapered interior of said lower member between said inlet plenum and said receptacle.

2. A water purification device in accordance with claim 1 wherein said module further includes an annular seal extending radially outward from its exterior near its upper end, said module and said seal being configured so that both the lower end of said module and said annular seal engage said tapered interior of said lower member.

3. A water purification device in accordance with claim 1 wherein said upper member includes means for forcing said module downwardly during assembly of said pressure vessel to seal said lower exterior portion of said module against said tapered interior of said lower member.

4. A water purification device in accordance with claim 1 further comprising a loop of flexible material having a bottom portion extending beneath said module, side portions extending up the side of said module, and a top portion extending above the module, whereby said module may be dislodged from said vessel by pulling said top portion upward.

5. A water purification device for separating water from dissolved impurities therein, comprising:
   a two-piece pressure vessel;
   a reverse-osmosis module disposed within said pressure vessel;
   an inlet fitting on said pressure vessel for enabling flow of unpurified water into said pressure vessel;
   first outlet means on said pressure vessel for enabling flow of purified water from said pressure vessel;
   second outlet means on said pressure vessel for enabling restricted flow of unpurified water and impurities from said pressure vessel;
   said pressure vessel comprising an upper member and a lower member, said upper member having quick-disconnect coupling means thereon to enable releasable connection of said device to a source of water;
   each of said upper and lower members having an out wall;
   said upper and lower members having mutually cooperable threads formed on their outer walls to enable said members to be releasably attached to one another; and
   handle means comprising a loop of flexible material having a bottom portion extending beneath said module and a top portion extending above said module, whereby said module may be dislodged from said vessel by pulling said top portion upward.

6. A water purification device for separating water from dissolved impurities therein, comprising:
   a two-piece pressure vessel;
   a reverse-osmosis module disposed within said pressure vessel;
   an inlet fitting on said pressure vessel for enabling flow of unpurified water into said pressure vessel;
   first outlet means on said pressure vessel for enabling flow of purified water from said pressure vessel; and
   second outlet means on said pressure vessel for enabling restricted flow of unpurified water and impurities from said pressure vessel;
   said pressure vessel comprising an upper member and a lower member, said upper member having quick-disconnect coupling means thereon to enable releasable connection of said device to a source of water;
   each of said upper and lower members having an outer wall;
   said upper and lower members having mutually cooperable threads formed on their outer walls to enable said members to be releasably attached to one another;
   said module comprising a spirally wound membrane assembly disposed upon a perforated tubular cone, and filter means disposed within said core; said membrane assembly comprising a spirally-wound envelope and a spirally-wound separator grid disposed so that adjacent windings of said envelope are separated from one another by said separator grid; said envelope comprising first and second layers of semipermeable membrane and a layer of porous material disposed therebetween;
   said module being operatively associated with said pressure vessel so that purified water flows into said perforated core from said membrane assembly;
   said filter means disposed within said core comprising a stack of felt disks permeated with carbon particles.

* * * * *

UNITED STATES PATENT AND TRADEMARK OFFICE
CERTIFICATE OF CORRECTION

PATENT NO. :   4,609,463

DATED      :   September 2, 1986

INVENTOR(S) :  Macevicz and Mulherin

It is certified that error appears in the above-identified patent and that said Letters Patent is hereby corrected as shown below:

Col. 5, line 67:   "side" (second occurrence) should read --sides--.

Col. 6, line 19:   "out" should read --outer--.

Col. 6, line 54:   "cone" should read --core--.

Signed and Sealed this

Second Day of December, 1986

*Attest:*

DONALD J. QUIGG

*Attesting Officer*     *Commissioner of Patents and Trademarks*